United States Patent [19]

Hinselmann et al.

[11] 4,086,191

[45] Apr. 25, 1978

[54] PARTICULATE EXPANDABLE STYRENE POLYMERS FOR THE MANUFACTURE OF FOAMS

[75] Inventors: Klaus Hinselmann, Mutterstadt; Klaus Penzien, Frankenthal; Rupert Schick, Ludwigshafen; Manfred Walter, Speyer; Heinz Weber, Gruenstadt; Heinrich Wirth, Frankenthal, all of Germany

[73] Assignee: BASF Aktiengesellschaft, Ludwigshafen, Germany

[21] Appl. No.: 618,931

[22] Filed: Oct. 2, 1975

[30] Foreign Application Priority Data

Oct. 11, 1974 Germany .............................. 2448476
Oct. 15, 1974 Germany .............................. 2448956
Jan. 17, 1975 Germany .............................. 2501680

[51] Int. Cl.$^2$ .............................. C08J 9/20; C08J 9/22
[52] U.S. Cl. .............................. 260/2.5 B; 260/2.5 FP; 260/DIG. 24; 260/45.7 R
[58] Field of Search ........... 260/2.5 FS, 2.5 E, 2.5 FP

[56] References Cited

U.S. PATENT DOCUMENTS

| | | | |
|---|---|---|---|
| 2,894,918 | 7/1959 | Killoran et al. | 260/2.5 FP |
| 3,009,888 | 11/1961 | Mueller-Tamm et al. | 260/2.5 FP |
| 3,093,599 | 6/1963 | Mueller-Tamm et al. | 260/2.5 FP |
| 3,192,169 | 6/1965 | Doak | 260/2.5 B |
| 3,207,731 | 9/1965 | Tousignant | 260/2.5 FP |
| 3,271,333 | 9/1966 | Eichhorn | 260/2.5 FP |
| 3,361,687 | 1/1968 | Stahnecker | 260/2.5 FP |
| 3,457,204 | 7/1969 | Burger et al. | 260/2.5 FP |
| 3,923,706 | 12/1975 | Aebelhart et al. | 260/2.5 B |

*Primary Examiner*—Morton Foelak
*Attorney, Agent, or Firm*—Keil, Thompson & Shurtleff

[57] ABSTRACT

Particulate expandable styrene polymers which contain from 0.0001 to 0.2% by weight, based on the styrene polymer, of an inhomogeneously distributed nucleating agent for expandable polystyrene, the nucleating agent being present only in a peripheral zone of the particles while the interior of the particles is free from nucleating agent. Nucleating agents which may be used are organic compounds having at least three bromine atoms, bonded to aliphatic or cycloaliphatic structures, in the molecule, or bromine compounds which are polymerizable, or are copolymerizable with styrene.

6 Claims, No Drawings

PARTICULATE EXPANDABLE STYRENE POLYMERS FOR THE MANUFACTURE OF FOAMS

The present invention relates to expandable styrene polymers which are distinguished by a combination of advantageous properties and which may, in particular, be used for the manufacture of foams with very advantageous heat conductivity values.

Processes for the manufacture of expandable styrene polymers, and for the use of these polymers, are well known, and it has also been disclosed that finely cellular polystyrene foams, with from 10 to 25 cells/mm, require only short minimum residence times in the mold. Several methods which may be used to produce such finely cellular polystyrene foams are to be found in the literature. Thus, German Printed Application No. 1,520,790 recommends producing fine foamable polystyrene beads by carrying out the polymerization of styrene in the presence of blowing agents and polyethylene or polypropylene of average molecular weight less than 4,000. According to the method of French Pat. No. 1,530,701, brominated compounds are initially introduced into the polymerization batches and the polymerization is then carried out in the presence of these compounds.

It is an object of the present invention to provide particulate expandable styrene polymers which may be processed to give foams having particularly advantageous heat conductivity values.

We have found that this object is achieved by particulate expandable styrene polymers which contain from 0.0001 to 0.2 percent by weight, based on the styrene polymer, of a nucleating agent for expandable polystyrene, which nucleating agent is only present in a peripheral zone (usually from 0.1 to 3.0 mm thick) of the particles, whilst the interior of the particles is free from nucleating agents.

A further object of the invention is particulate expandable styrene polymers which contain from 0.0001 to 0.2 percent by weight, based on the styrene polymer, of an organic bromine compound which is homopolymerizable, or copolymerizable with styrene, contains one or more bromine atoms bonded to an aliphatic or cycloaliphatic structure, and is present in the form of its polymer, copolymers or monomer, inhomogeneous distributed so that the organic bromine compound is only present in a peripheral zone of the particles whilst the interior of the particles is free from the bromine compound.

A further object of the invention is particulate expandable styrene polymers which in addition to homogeneously distributed organic bromine compounds (to provide flameproofing) and alkanolamines, also contain from 0.0001 to 0.2 percent by weight, based on the styrene polymer, of an organic bromine compound which is homopolymerizable, or copolymerizable with styrene, contains one or more bromine atoms bonded to an aliphatic or cycloaliphatic structure, and is present in the form of its polymer, copolymers or monomer, inhomogeneously distributed so that the organic bromine compound is only present in a peripheral zone of the particles whilst the interior of the particles is free from the bromine compound.

The narrow finely cellular peripheral zone of the individual particles may be produced, according to the invention, by allowing a suitable nucleating agent to diffuse under appropriate conditions into the particle from outside, whilst restricting the time available for diffusion so that only a thin peripheral zone undergoes nucleation.

After foaming, such particles show from 4 to 7 cells/mm in the interior of the individual particles, whilst the narrow edge zone shows a much higher number of cells.

Depending on the process of manufacture of the expandable polystyrene, various procedures may be followed to achieve this result. If, e.g., the expandable polystyrene is produced by suspension polymerization, the nucleating agent can advantageously be added to the suspension shortly before, during or after completion of the reaction cycle, and the mixture can be cooled in the conventional way. However, it is also possible to suspend finished expandable granules in a suitable inert medium, heat the suspension under pressure to a temperature above the softening point of the expandable polystyrene, add the nucleating agent and, after having allowed a certain time for diffusion of the nucleating agent, cool the mixture again. It is furthermore possible, when manufacturing expandable polystyrene by post-impregnation, to introduce the nucleating agent into the reaction vessel toward the end of the impregnating cycle and then to complete the impregnation process in the conventional manner.

Where polymerizable bromine compounds are used, the thin finely cellular peripheral zone of the individual particles, which the invention provides, can be produced by allowing an organic compound which is polymerizable, or copolymerizable with styrene, and which contains one or more bromine atoms bonded to aliphatic or cycloaliphatic structures, to diffuse from outside into the expandable polystyrene particles, the conditions being so chosen that the polymerization or copolymerization of the organic bromine compound takes place at the same time. The polymers of relatively high molecular weight which are produced during this polymerization or copolymerization are virtually no longer capable of diffusion and have the effect that only a thin peripheral zone of the particles is nucleated. Depending on the process of manufacture of the expandable polystyrene, various procedures may be employed to produce the peripheral zone of fine cells. If, e.g., the expandable polystyrene is produced by suspension polymerization, the bromine compound which acts as the nucleating agent is advantageously metered into the suspension at a point in time between the particle identity point and the end point of the polymerization cycle, and the polymerization is completed in the conventional manner. However, it is also possible to suspend finished expandable granules in a suitable inert medium, heat the mixture under pressure to above the softening point of the expandable polystyrene, meter in the bromine compound which acts as the nucleating agent and cool the mixture again, after having allowed a certain time for diffusion and polymerization of the nucleating agent. It is also possible, when manufacturing the expandable polystyrene by post-impregnation, to meter the nucleating agent into the reaction vessel toward the end of the impregnation cycle and then to complete the impregnation process in the conventional manner.

Where flameproofing agents containing bromine, and alkanolamines, are used conjointly, a suitable process for the manufacture of such expandable styrene polymers is to polymerize styrene and, if desired, conventional comonomers is aqueous suspension at above 85° C, by means of initiators which form free radicals, in the conventional manner and to add an alkanolamine, which is soluble in the organic phase of the suspension, before or during the polymerization. The bromine compound which acts as the nucleating agent is in that case advantageously metered into the suspension at a point in time between the particle identity point and the end point of the polymerization cycle, and the polymerization is completed in the conventional manner.

In principle the nucleating agents employed can be any of the conventional nucleating agents for expandable polystyrene and in particular highly active organic substances with three or more bromine atoms, bonded to an aliphatic or cycloaliphatic structure, per molecule, and brominated polymers of a 1,3-diene of degree of polymerization $\geq 2$. The concentration of the nucleating agent, which is inhomogeneously distributed, as has been described, in the expandable styrene polymer, is advantageously from 0.0001 to 0.2%.

Further suitable nucleating agents are in principle all conventional polymerizable organic bromine compounds wherein the bromine atoms are bonded to aliphatic or cycloaliphatic structures. The more rapidly a substance can polymerize, or copolymerize with styrene, the more advantageous is its effect.

In a particular embodiment of the invention, the expandable styrene polymers additionally contain organic halogen compounds as flameproofing agents, in addition to alkanolamines. The flameproofing organic halogen compounds used are in particular bromine compounds, e.g. the brominated oligomers of butadiene or isoprene of average degree of polymerization from 2 to 20. These compounds may be completely or partially brominated. Typical examples are 1,2,5,6-tetrabromocyclooctane, 1,2,5,6,9,10-hexabromocyclododecane, brominated polybutadiene, e.g. of degree of bromination from 3 to 15, and 1-($\alpha,\beta$-dibromoethyl)-3,4-dibromocyclohexane. The amounts employed are usually from 0.2 to 3%, preferably from 0.4 to 1.0%. It may be advantageous to add synergistic substances, e.g. di-t-butyl peroxide, dicumyl peroxide, poly-p-diisopropylbenzene and the like.

According to the same particular embodiment of the invention, the expandable styrene polymers also contain oxyalkylation products of ammonia or of primary or secondary amines, as claimed, e.g., in German Published Application No. 2,104,867. Examples of very suitable alkanolamines are monoalkanolamines, such as N-decylethanolamine, N-methylethanolamine, N-stearylethanolamine, N,N-bis-n-dodecylethanolamine and N,N-bis-cyclohexylpropan-2-olamine, dialkanolamines, such as N,N-bis-2-hydroxypropyl-n-dodecylamine or N,N-bis-hydroxyethyl-n-octadecylamine and trialkanolamines, such as tri-(N-2-hydroxybutyl)-amine. The alkanolamines are employed in amounts of from 0.00001 to 1 percent by weight, especially from 0.0001 to 0.1 percent by weight, based on the styrene polymer. The substances may be added to the organic phase, to the aqueous phase or to the reaction mixture, before, during or toward the end of the polymerization.

We have found that moldings manufactured from the expandable polystyrenes of the invention can, surprisingly, be released from the mold after very short minimum mold residence times. In the products, the foam structure in the inner zones of the individual particles is coarse, which results in a favorable, i.e. low, heat conductivity, and only a thin peripheral zone, which is virtually negligible compared to the total cross-sectional area of the bead, shows a foam structure with fine cells.

A further advantage of the expandable polystyrenes of the invention is that the moldings produced therefrom are dimensionally very stable, i.e. the lateral collapse normally observed virtually no longer occurs.

Furthermore, the expandable polystyrenes of the invention give moldings wherein the densities of small units of volume show virtually no variation over the entire molding. This is of very great importance in the manufacture of foam sheets or blocks, where certain minimum densities must be guaranteed.

In relation to the present invention, styrene polymers means polystyrene and styrene copolymers which contain at least 50 percent by weight of copolymerized styrene units. Examples of suitable comonomers are $\alpha$-methylstyrene, nuclear-halogenated styrenes, nuclear-alkylated styrenes, acrylonitrile, methacrylonitrile, esters of acrylic acid and methacrylic acid with alcohols of 1 to 8 C atoms, N-vinylcarbazole, maleic anhydride and small amounts of compounds which contain two polymerizable double bonds, e.g. butadiene, divinylbenzene, butanediol diacrylate and the like. The styrene polymers contain one or more homogeneously distributed blowing agents. Examples of suitable blowing agents are hydrocarbons or halohydrocarbons which are gaseous or liquid under normal conditions, which do not dissolve the styrene polymer and which boil below the softening point of the polymer, e.g. propane, butane, pentane, cyclopentane, hexane, cyclohexane, dichlorodifluoromethane and trifluorochloromethane. The styrene polymers in general contain from 3 to 15 percent by weight, based on polymer, of the blowing agents.

The polymer may also contain additives, such as plasticizers, stabilizers, dyes, fillers or flameproofing agents. Furthermore, the expandable polystyrenes of the invention may be surface-coated, in the conventional manner, with substances which lower the flammability, prevent caking during pre-foaming, act as antistatic agents, further reduce the minimum mold residence time and the like.

The expandable polystyrenes are manufactured by processes conventionally used in the art. The products may be in the form of beads or in any other form, and the diameter of the particles is advantageously from 0.1 to 6 mm, in particular from 0.3 to 3 mm.

The inhomogeneous distribution of the nucleating agent within the individual particles, provided by the invention, is achievable by allowing a suitable nucleating agent to diffuse into the particles from the outside, but at the same time limiting the time available for diffusion so that only a thin peripheral zone is nucleated. Depending on the process of manufacture of the expandable polystyrene, different approaches may be employed for this purpose. If, e.g., the expandable polystyrene is produced by the conventional suspension polymerization process, the nucleating agent is metered into the suspension at a certain point in time. This point in time depends, in the case of non-polymerizable nucleating agents, on the polymerization conditions. If the polymerization is carried out at temperatures above the softening point of the expandable polystyrene, the nucleating agent is introduced shortly before, at or shortly after the end of the polymerization cycle. What is important in this context is the rate at which the reaction vessel is cooled after completion of the polymerization cycle. The lower the polymerization temperature, the earlier is the point in time, before the end of the polymerization cycle, at which the nucleating agent can be introduced; in general, this time is from 0 to 120 minutes before the end of the polymerization cycle. The nucleating agent is suitably added in the form of a solution in a material, or a mixture of different materials, which can be used as blowing agents for expandable polystyrene, and preferably in the material or materials which are used as the blowing agent for the particular product. If the nucleating agent is water-soluble, it can also be added as an aqueous solution, whilst if it is alcohol-soluble it can also be added as an alcoholic solution. Other water-miscible organic liquids which are insoluble in polystyrene can also be used as solvents for the nucleating agent.

This inhomogeneous distribution of the nucleating agent within the individual particles can furthermore be achieved, according to the invention, by allowing an organic bromine compound which is a suitable nucleating agent, and is polymerizable, or copolymerizable with styrene, to diffuse into the particles from the outside, the conditions being so chosen that the polymerization which occurs at the same time prevents the polymerizable organic bromine compound from penetrating too deeply into the particles and ensures that only a thin peripheral zone is nucleated.

Depending on the process of manufacture of the expandable polystyrene, different procedures can be used for this purpose. If, e.g., the expandable polystyrene is produced by the conventional suspension polymerization process, the nucleating agent is added to the suspension at a certain point in time. This point in time depends on the one hand on the polymerization conditions and, on the other, on the rate of polymerization or copolymerization of the bromine compound employed. In every case, however, the nucleating agent must be added after the so-called "particle identity point" (for definition see, e.g., J. Appl. Polym. Sci., 3 (1960) 374) is reached, since otherwise the polymerizable bromine compound would become distributed over the entire cross-section of the particle because of the continuing agglomeration and deagglomeration processes which the droplets of the organic phase undergo up to this point. On the other hand, the time at which the nucleating agent is added must be so far from the point at which the expandable polystyrene, on cooling after completion of the polymerization cycle, falls below the glass transition temperature that the polymerizable bromine compound is still able to diffuse into the particles, and polymerize. In general, the nucleating agent is added after from 40 to 95% of the polymerization time has elapsed.

The nucleating agent is suitably added in the form of a solution in a material, or a mixture of different materials, which can be used as blowing agents for expandable polystyrene, and preferably in the material or materials which are used as the blowing agent for the particular product. If the nucleating agent is water-soluble, it can also be added as an aqueous solution, whilst if it is alcohol-soluble it can also be added as an alcoholic solution. Other water-miscible organic liquids which are insoluble in polystyrene can also be used as solvents for the nucleating agent. If the nucleating agent is added at a relatively early stage, it can also be introduced as a solution in styrene without increasing the residual monomer content in the end product.

If the material concerned is finished expandable polystyrene, to which the peripheral zone of fine cell structure is to be imparted subsequently, this may be achieved by, e.g., the following procedure.

The following polystyrene is suspended in an inert medium, normally water, in a pressure-resistant reactor, using a conventional organic or inorganic dispersing agent, and the suspension is heated to a temperature above the softening point of the expandable polystyrene. The nucleating agent is then added in the same way as has been described for the process of manufacture by suspension polymerization. Thereafter, the suspension is left for some time at a temperature above the softening point of the expandable polystyrene, and is then cooled. The time required for the diffusion of the nucleating agent and—where polymerizable nucleating agents are used—for its polymerization depends on the chosen temperature. It is in general from 15 to 120 to 15 to 300 minutes. Where polymerizable nucleating agents are used, it can be of advantage, when working at relatively low temperatures, to accelerate the polymerization of the polymerizable organic bromine compound by adding a small amount of a conventional initiator which forms free radicals.

If the expandable polystyrene is procuded by conventional processes of post-impregnation (= subsequent impregnation, with blowing agent, of previously finished polystyrene particles), the nucleation in the peripheral zone takes a particularly advantageous form. In such cases the nucleating agent is simply introduced into the reaction vessel at a certain point in time before the end of the impregnation process and the impregnation cycle is completed in the conventional way which would be used in the absence of the nucleating agent. The addition of the nucleating agent is made in the same way as described for the process of manufacture by suspension polymerization. The interval between the point in time at which the nucleating agent is added and the end of the impregnation cycle again depends on the chosen temperature. In the case of non-polymerizable nucleating agents it is in general from 15 to 120 minutes, and in the case of polymerizable nucleating agents from 15 to 300 minutes. If polymerizable nucleating agents are used it can be of advantage, when employing relatively low temperatures, to accelerate the polymerization of the polymerizable organic bromine compound by adding a small amount of a conventional initiator which produces free radicals.

Nucleating agents which may be used in the process according to the invention are, in particular, compounds which contain three or more bromine atoms bonded to aliphatic or cycloaliphatic structures, e.g. bromoform, bromal, tetrabromoethane, tetrabromoethylene, tribromoethylene, tribromoethane, tetrabromobutane, [1-chloro-2,2,2-tribromo]-ethyl-2,3-dibromopropionate, hexabromoethane, brominated paraffin oil containing 30% of bromine, 1-[1,2-dibromoethyl]-3,4-dibromocyclohexane, 1,2,5,6-tetrabromocyclooctane, phenyl-tribromomethane, p-bis-[tribromomethyl]-benzene, 2,2,2-tribromoethanol, bis-[2,2,2-tribromoethyl] ether, 1,1,1-tribromoacetone, tribromoacetic acid, monobromalurea and many others.

Further suitable nucleating agents for carrying out the process of the invention are compounds which are polymerizable, or copolymerizable with styrene, and contain one or more bromine atoms bonded to an aliphatic or cycloaliphatic structure, e.g. 2,3-dibromopropyl acrylate, 2,3-dibromopropyl methacrylate, 3-bromopropyl acrylate, 2-bromopropyl methacrylate, bis-2-bromoethyl maleate, 2-bromoethyltriethylammonium acrylate, methyl γ-bromocrotonate, 2-bromocyclohexyl methacrylate, methylene-[acrylamide]-[2,3-dibromopropionamide], N-[2-bromoethyl]-methacrylamide, vinyl bromide, vinylidene bromide, [2,3-dibromopropyl]-[2,3-dichloropropyl]-[allyl] phosphate, 2,3-dibromopropyl allyl ether, o-[1,2-dibromoethyl]-styrene, m-[tribromomethyl]-styrene, [1-chloro-2,2,2-tribromo]-ethyl acrylate, [1-chloro-2,2,2-tribromo]-ethyl methacrylate, 2-bromoethyl acrylate, 2,2,2-tribromoethyl acrylate, tetrabromobutanediol diacrylate, [1-chloro-2,3-dibromo]-propyl acrylate, [1-chloro-2,3-dibromo]-propyl methacrylate and the like.

The polymerizable organic compound should contain from 10 to 90% of bromine, preferably from 30 to 80% of bromine. Mixtures of such compounds can also be used.

The expandable styrene polymers of the invention are suitably manufactured by the conventional bead polymerization process, at from 85° to 130° C.

Suspension stabilizers which may be used are organic protective colloids, e.g. polyvinyl alcohol, polyvinylpyrrolidone or mineral suspending agents, e.g. finely divided tricalcium phosphate, barium sulfate and the like.

The polymerization is initiated by conventional methods using one or more substances which form free radicals. t-butyl perbenzoate, t-butyl perisononanate, di-t-butyl peroxide, dibenzoyl peroxide and mixtures of these may be mentioned as examples.

We have found that the minimum mold residence times of articles of expandable polystyrene which has been produced according to the invention are very much shorter than those of moldings of a product which, except for the nucleation in the peripheral zone, has been produced by the same process. The minimum mold residence times of the product according to the invention are reduced by from 60 to 99%, normally from 75 to 95%. The degree of reduction depends of course on the amount of nucleating agent employed.

The minimum mold residence times (MMRT) are determined by the following method: the pre-foamed styrene polymer particles are welded together in a mold, by means of steam, to form a molding in the center of which a pressure-sensing device is located. The time from the start of the cooling period to the point at which the pressure inside the molding has dropped to 1.05 bars is determined. Experience has shown that at this latter pressure the moldings can safely be released.

Moldings which have been produced from particulate expandable styrene polymers as a rule do not have the same density in each unit of volume; instead, they have a density distribution such that the densities in the peripheral zones of the molding are much greater than in zones nearer the center of the molding. In fact, the density in the peripheral zone may be twice as high as in the center. When manufacturing sheets from foam blocks, this results in sheets of different densities being produced, which is undesirable from the point of view of quality.

We have now found that using the particulate expandable styrene polymers manufactured according to the invention it is possible to produce moldings which show virtually no variations in density over the entire volume.

To characterize the density distribution, a rectangular piece of size 15 × 15 × 50 cm is cut from a foam block of size 100 × 100 × 50 cm from the middle of one large face to the other and is then sub-divided into ten pieces of size 15 × 15 × 5 cm. The density of each of these 10 pieces is determined and this gives the density distribution from the middle of one of the large faces to the middle of the other large face of the block. The density distribution curves thus obtained are characterized by two parameters, the excess density (ED) and the density difference (DD) which are defined as follows:

$$\text{Excess density (ED) [\%]} = \frac{\text{Average density of the 10 pieces} - \text{density of the lightest piece}}{\text{density of the lightest piece}} \times 100$$

$$\text{Density difference (DD)} = \frac{\text{Density of the heaviest piece} - \text{density of the lightest piece}}{\text{Average density of the 10 pieces}}$$

The excess density, in percent, indicates the percentage by which a sheet manufacturer must increase the amount, or bulk density, of the pre-foamed particulate expandable styrene polymers if he is to guarantee that the lightest sheet has a certain minimum density. The density difference is a measure of the difference between the heaviest and lightest sheet, relative to the average density.

In the Examples which follow, parts are by weight.

EXAMPLE 1

A mixture of 150 parts of tapwater, 0.1 part of Na pyrophosphate, 100 parts of styrene, 0.45 part of benzoyl peroxide, 0.15 part of tert.-butyl perbenzoate and 7 parts of pentane was heated, whilst stirring, to 90° C in a pressure-resistant stirred kettle made of stainless steel. After 2 hours at 90° C, 4 parts of a 10 percent strength aqueous solution of polyvinylpyrrolidone were added. After 6 hours at 90° C, the batch was heated for 2 hours at 100° C and for another 2 hours at 120° C.

45 Minutes before the end of the cycle, 0.01 part of tetrabromoethane dissolved in 1 part of pentane was added. After completion of the polymerization cycle, the batch was cooled. The bead polymer produced was separated from the aqueous phase, washed, dried and sieved.

The bead fraction of from 1.0 to 2.3 mm diameter was pre-foamed to a bulk density of 15 g/l by means of a stream of steam in a Rauscher continuous stirred pre-foamer. The pre-foamed beads were stored for 24 hours and then welded in a Rauscher block mold, by 20 seconds' treatment with steam at 1.8 bars, to form a block. The measured minimum mold residence time was 8 minutes, the density excess was 6.3% and the density difference 0.15. The pre-foamed beads had the following cell structure: peripheral zone about 0.7 mm wide, average 18 cells/mm, inner zone average 6 cells/mm.

COMPARATIVE EXAMPLE

If the procedure of Example 1 is followed but tetrabromoethane is not added, a product is obtained which gives the following results when a block is manufactured under the same conditions as in Example 1:
minimum mold residence time: 105 minutes
excess density: 31%
density difference: 0.65.

The pre-foamed beads show no peripheral zone and instead have a uniform cell structure of 5 cells/mm over the entire bead cross-section.

EXAMPLE 2

The procedure described in Example 1 is followed but the time of addition of the solution of the same amount of tetrahydrobromoethane in pentane is varied. Table 1 shows the results thus obtained.

TABLE 1

| Time of addition, minutes before end of cycle | MMRT [mins.] | ED [%] | DD | Depth of peripheral zone [mm] | Number of cells interior [cells/mm] | Number of cells peripheral zone [cells/mm] |
| --- | --- | --- | --- | --- | --- | --- |
| 45 + | 8 | 6.3 | 0.15 | 0.7 | 6 | 18 |
| 60 | 9 | 9.5 | 0.19 | 1.2 | 6 | 15 |
| 30 | 8 | 6.5 | 0.16 | 0.6 | 4 | 17 |
| 15 | 30 | 14.5 | 0.52 | 0.6 | 4 | 13 |
| 5 | 53 | 15.2 | 0.55 | 0.4 | 5 | 10 |

+ identical to Example 1.

EXAMPLE 3

The procedure described in Example 1 is followed but the amount of tetrabromoethane added is varied. The tetrabromoethane is once again added in the form of a solution in pentane, and in each case the addition is made 30 minutes before the end of the cycle. The results obtained are shown in Table 2

TABLE 1

| Amount added [parts] | MMRT [mins.] | ED [%] | DD | Width of peripheral zone [mm] | Number of cells interior [cells/mm] | Number of cells peripheral zone [cells/mm] |
| --- | --- | --- | --- | --- | --- | --- |
| 0.01 | 8 | 6.5 | 0.16 | 0.6 | 4 | 17 |
| 0.0067 | 28 | 14.2 | 0.44 | 0.5 | 5 | 11 |
| 0.0033 | 52 | 14.5 | 0.53 | 0.4 | 4 | 9 |

EXAMPLE 4

The procedure followed is as in Example 1 but instead of tetrabromoethane 0.005 part of tetrabromobutane dissolved in one part of pentane is employed and the material is added 45 minutes before the end of the cycle. The following values were measured on a block of the product obtained:
minimum mold residence time: 21 minutes;
excess density: 9.5%;
density difference: 0.37.

The pre-foamed beads showed an 0.5 mm deep peripheral zone of fine cells. The average packing of the cells in the peripheral zone was 13 cells/mm whilst the average in the inner zone of the particles was 6 cells/mm.

EXAMPLE 5

The procedure followed is as in Example 1, but instead of tetrabromoethane 0.0025 part of [1-chloro-2,2,2-tribromo]-ethyl 2,3-dibromopropionate dissolved in 1 part of pentane is added 60 minutes before the end of the cycle. The following values were measured on a block of the product obtained:
minimum mold residence time: 9 minutes;
excess density: 5.7%;
density difference: 0.19.

The pre-foamed beads showed an 0.4 mm deep peripheral zone of fine cells, with an average of 19 cells/mm, and an inner zone of coarse cells, with an average of 6 cells/mm.

EXAMPLE 6

100 Parts of extruded granules of expandable polystyrene are suspended in 150 parts of tapwater, in which 1.5 parts of hydroxyapatite have been precipitated in a finely divided form by slow addition of a solution of calcium chloride to the solution of Na phosphate, in a closed pressure-resistant stainless steel vessel. The suspension is heated to 120° C whilst stirring. 0.01 part of tetrabromoethane dissolved in 1 part of pentane is then added. The temperature is then maintained at 120° C for a further 45 minutes, after which the batch is cooled. After cooling, the granules are separated from the aqueous phase, washed and dried.

A block was then molded from the granules, as described in Example 1, and the following results were obtained:
minimum mold residence time: 11 minutes;
excess density: 7.3%;
density difference: 0.19.

The pre-foamed particles had an 0.7 mm deep peripheral zone with an average of 15 cells/mm whilst the inner zone had 6 cells/mm. In comparison, the same expandable styrene granules without a subsequently imposed peripheral zone gave the following results when a block was produced:
minimum mold residence time: 95 minutes;
excess density: 26%;
density difference: 0.57.

The pre-foamed particles had 4 cells/mm and there was no peripheral zone.

EXAMPLE 7

A mixture of 150 parts of tapwater, 0.1 part of Na pyrophosphate, 100 parts of styrene, 0.45 part of benzoyl peroxide, 0.15 part of tert.-butyl perbenzoate and 7 parts of pentane was heated, whilst stirring, to 90° C in a pressure-resistant stirred kettle made of stainless steel. After 2 hours at 90° C, 4 parts of a ten percent strength aqueous solution of polyvinylpyrrolidone were added. After 6 hours at 90° C, the batch was heated at 100° C for 2 hours and then at 120° C for 2 hours.

2 Hours before the end of the cycle, 0.002 part of [1-chloro-2,2,2-tribromo]-ethyl acrylate dissolved in 1 part of pentane was added. After completion of the polymerization cycle, the batch was cooled. The bead polymer produced was separated from the aqueous phase, washed, dried and sieved.

The bead fraction of from 1.0 to 2.3 mm diameter was pre-foamed to a bulk density of 15 g/l by means of a stream of steam in a Rauscher continuous stirred pre-foamer. The pre-foamed beads were stored for 24 hours and then welded in a Rauscher block mold, by 20 seconds' treatment with steam at 1.8 bars, to form a block. The measured minimum mold residence time was 7 minutes, the density excess was 3.0% and the density difference 0.06. The pre-foamed beads had the following cell structure: peripheral zone about 0.4 mm wide, average 25 cells/mm, inner zone average 7 cells/mm.

COMPARATIVE EXAMPLE

If the procedure of Example 7 is followed but the acrylate containing bromine is not added, a product is obtained which gives the following results when a block is manufactured under the same conditions as in Example 7:
minimum mold residence time: 105 minutes;
excess density: 31%;

density difference: 0.65.

The pre-foamed beads show no peripheral zone but have a uniform cell structure of 5 cells/mm over the entire bead cross-section.

EXAMPLE 8

The procedure described in Example 7 is followed but the time of addition of the solution of the same amount of [1-chloro-2,2,2-tribromo]-ethyl acrylate dissolved in 1 part of pentane is varied. Table 3 shows the results thus obtained.

TABLE 3

| Times of addition/ minutes before end of cycle | MMRT [mins.] | ED [%] | DD | Depth of peripheral zone [mm] | Number of cells interior [cells/mm] | peripheral zone [cells/mm] |
| --- | --- | --- | --- | --- | --- | --- |
| 120+ | 7 | 3.0 | 0.06 | 0.4 | 7 | 25 |
| 180 | 8 | 3.5 | 0.08 | 0.3 | 5 | 24 |
| 240 | 10 | 4.5 | 0.12 | 0.3 | 5 | 22 |
| 300 | 10 | 5.0 | 0.15 | 0.3 | 6 | 21 |
| 360 | 12 | 5.0 | 0.17 | 0.3 | 6 | 18 |
| 60 | 9 | 4.0 | 0.12 | 0.4 | 5 | 22 |
| 30 | 15 | 5.7 | 0.19 | 0.7 | 5 | 17 |

+identical to Example 7.

EXAMPLE 9

The procedure described in Example 7 is followed but the amount of [1-chloro-2,2,2-tribromo]-ethyl acrylate is varied. The [1-chloro-2,2,2-tribromo]-ethyl acrylate is once again added in the form of a solution in pentane. In each case the addition is made 120 minutes before the end of the cycle. The results obtained are shown in Table 4.

TABLE 4

| Amount added [parts] | MMRT [mins] | ED [%] | DD | Depth of peripheral zone [mm] | Number of cells interior [cells/mm] | peripheral zone [cells/mm] |
| --- | --- | --- | --- | --- | --- | --- |
| 0.002+ | 7 | 3.0 | 0.06 | 0.6 | 7 | 25 |
| 0.0015 | 10 | 4.3 | 0.09 | 0.4 | 5 | 22 |
| 0.001 | 15 | 6.8 | 0.21 | 0.3 | 6 | 19 |

+identical to Example 7.

EXAMPLE 10

The procedure followed is as in Example 7 but instead of [1-chloro-2,2,2-tribromo]-ethyl acrylate 0.01 part of 2,3-dibromopropyl acrylate dissolved in 1 part of pentane is employed and the material is added 120 minutes before the end of the cycle. The following values were measured on a block of the product obtained:
minimum mold residence time: 12 minutes;
excess density: 6.4%;
density difference: 0.22.

The pre-foamed beads showed an 0.8 mm deep peripheral zone of fine cells. The average packing of the cells in the peripheral zone was 19 cells/mm whilst the average in the inner zone of the particles was only 5 cells/mm.

EXAMPLE 11

100 Parts of extruded granules of expandable polystyrene are suspended in 150 parts of tapwater, in which 1.5 parts of hydroxyapatite have been precipitated in a finely divided form by slow addition of a solution of calcium chloride to the solution of Na phosphate, in a closed pressure-resistant stainless steel vessel. The suspension is heated to 120° C whilst stirring. 0.005 part of [1-chloro-2,2,2-tribromo]-ethyl acrylate dissolved in 1 part of pentane is then added. The temperature is then maintained at 120° C for a further 2 hours, after which the batch is cooled. After cooling, the granules are separated from the aqueous phase, washed and dried.

A block was then molded from the granules, as described in Example 7, and the following results were obtained:
minimum mold residence time: 9 minutes;
excess density: 5.6%;
density difference: 0.16.

The pre-foamed particles had an 0.7 mm deep peripheral zone with an average of 17 cells/mm whilst the inner zone had 6 cells/mm. In comparison, the same expandable styrene granules without a subsequently imposed peripheral zone gave the following results when a block was produced:
minimum mold residence time: 99 minutes;
excess density: 29%;
density difference: 0.67.

The pre-foamed particles had 6 cells/mm and there was no peripheral zone.

EXAMPLE 12

Experiment (a)

The following mixture is charged into a pressure kettle of 1,000 l capacity, which is equipped with a stirrer and flushed with nitrogen: 450 l of water of 15° German hardness, 230 g of sodium pyrophosphate, 230 g of sodium acetate, 560 g of magnesium sulfate, 420 kg of styrene, 4.5 kg of acrylonitrile, 1.3 kg of t-butyl perbenzoate, 150 g of t-butyl peroctoate, 760 g of dicumyl peroxide, 1.9 kg of 1,2,5,6,9,10-hexabromocyclododecane and 42 g of bis-hydroxyethyl-dodecylamine (corresponding to 0.01%, based on styrene).

The mixture is polymerized in the closed kettle, whilst stirring, for 2 hours at 85° C followed by 12 hours at 115° C. Whilst heating the mixture from 85° to 115° C, 15 kg of a 10% strength solution of polyvinylpyrrolidone of K value 85 are added. 3 hours after reaching 115° C, 21 kg of n-pentane are introduced into the kettle in the course of 15 minutes. 2 hours before the end of the cycle, 42 g of [1-chloro-2,2,2-tribromo]-ethyl acrylate, dissolved in 5 kg of n-pentane, are introduced into the kettle in the course of 15 minutes.

Experiment (b)

In a second experiment, the same mixture is polymerized under the same conditions as under (a), except that 63 g of [1-chloro-2,2,2-tribromo]-ethyl acrylate are used.

Experiment (c)

Comparative Experiment for (a) and (b)

The same mixture as under (a), but without addition of [1-chloro-2,2,2-tribromo]-ethyl acrylate, is polymerized. The 5 kg of pentane previously added with the acrylate are combined with the first amount of pentane added.

The polymers from the three experiments (a), (b) and (c) were washed, dried and sieved. In each case, the bead fraction of diameter from 1.0 to 2.3 mm was pre-foamed to a bulk density of 15 g/l by means of a stream of steam in a Rauscher continuous stirred pre-foamer. The pre-foamed beads were stored for 24 hours and then welded in a Rauscher block mold, by 20 seconds' treatment in the steam at 1.8 bars, to form a block. The results obtained are shown in Table 5.

TABLE 5

| Property measured | Experiment a | Experiment b | Experiment c |
|---|---|---|---|
| MMRT (mins.) | 20 | 15 | 50 |
| ED (%) | 6 | 4 | 37 |
| DD | 0.1 | 0.06 | 0.25 |
| lateral collapse (%) | 0.3 | 0.4 | 0.4 |

EXAMPLE 13

Experiment (a)

Essentially the same mixture as in Example 12, experiment (a), was polymerized under the same conditions, except that 82 g of [1-chloro-2,3-dibromo]-propyl acrylate, dissolved in 5 kg of pentane, were introduced into the kettle in the course of 15 minutes 2 hours before the end of the cycle.

Experiment (b)

Essentially the same mixture as in Example 12, experiment (a), was polymerized under the same conditions, except that 210 g of 2,3-dibromopropyl acrylate, dissolved in 5 kg pentane, were introduced into the kettle in the course of 15 minutes 2 hours before the end of the cycle.

The comparative experiment to experiments (a) and (b) is identical with experiment (c) in Example 12.

Foam blocks were produced from the polymers of experiments (a) and (b) as described in Example 1. Table 6 shows the results obtained.

TABLE 6

| Property measured | Experiment a | Experiment b | Experiment c |
|---|---|---|---|
| MMRT (mins.) | 18 | 21 | 50 |
| ED (%) | 5 | 7 | 37 |
| DD | 0.1 | 0.15 | 0.25 |
| lateral collapse (%) | 0.4 | 0.3 | 0.4 |

EXAMPLE 14

Experiment (a)

Essentially the same mixture as in Example 12, experiment (a), was polymerized under the same conditions, except that the 42 g of [1-chloro-2,2,2-tribromo]-ethyl acrylate, dissolved in 5 kg of n-pentane, were introduced into the kettle in the course of 15 minutes 3 hours before the end of the cycle.

Experiment (b)

Essentially the same mixture as in Example 12, experiment (a), was polymerized under the same conditions, except that the 42 g of [1-chloro-2,2,2-tribromo]-ethyl acrylate, dissolved in 5 kg of n-pentane, were introduced into the kettle in the course of 15 minutes 1 hour before the end of the cycle.

The comparative experiment (c) to experiments (a) and (b) is identical with experiment (a) in Example 12.

Foam blocks were produced from the polymers of experiments (a) and (b) as described in Example 1. Table 7 shows the results obtained.

TABLE 7

| Experimental parameter/property measured | Experiment a | Experiment b | Experiment c |
|---|---|---|---|
| Time of addition of nucleating agent (hrs) + | 3 | 1 | 2 |
| MMRT (mins.) | 25 | 30 | 20 |
| ED (%) | 9 | 12 | 6 |
| DD | 0.17 | 0.20 | 0.1 |
| lateral collapse (%) | 0.3 | 0.4 | 0.3 |

+(hrs) before end of the cycle.

We claim:

1. A process for the manufacture of expandable styrene polymers containing from 0.0001 to 0.2 percent by weight, based on the styrene polymer, of a nonhomogeneously distributed nucleating agent for expandable polystyrene which comprises: treating expandable polystyrene particles at a temperature above their softening point with organic bromine nucleating compounds which contain at least three bromine atoms per molecule bonded to an aliphatic or cycloaliphatic structure and limiting the time available for the diffusion of the bromine compound into the expandable polystyrene particles such that said bromine compound is only present in a thin peripheral zone of the particles whereas the interior of said particles is free from the bromine compound, and whereby after foaming the expandable polystyrene particles, said foamed particles show a coarse cellular structure of from about 4 to 7 cells/mm in the interior while the thin peripheral zone has a fine cellular structure which is from about 0.1 to 3 mm thick, said peripheral zone having a negligible thickness compared to the total cross-sectional area of the foamed particle.

2. A process for the manufacture of expandable styrene polymers as set forth in claim 1, wherein the bromine compound is incorporated into the particles of the expandable polystyrene during their manufacture by suspension polymerization and the point in time at which the bromine compound is added is so chosen that only a limited time is available for the diffusion of the bromine compound and only a thin peripheral zone is reached by the nucleating agent.

3. A process as set forth in claim 1, wherein the bromine compounds are incorporated into the particles of the expandable polystyrene during their manufacture by a suspension polymerization and the point in time at which the bromine compound which is polymerizable, or copolymerizable with styrene, is added is between the particle identity point and the end of the polymerization cycle.

4. A process as set forth in claim 1, wherein [1-chloro-2,2,2-tribromo]-ethyl acrylate is used as the bromine compound.

5. A process for the manufacture of expandable styrene polymers containing from 0.0001 to 0.2 percent by weight, based on the styrene polymer, of a nonhomogeneously distributed nucleating agent for expandable polystyrene which comprises: treating expandable polystyrene particles with an organic bromine compound as nucleating agent which is polymerizable or copolymerizable with styrene, contains one or more bromine atoms bonded to an aliphatic or cycloaliphatic structure, and is present in the form of its polymer, copolymer or monomer, and allowing the bromine compound to diffuse into the particles of the expandable polystyrene from the outside under conditions wherein the polymerization of copolymerization of the bromine compound takes place at the same time and wherein the bromine compound is only present in a thin peripheral zone of the particles whereas the interior of the particles is free from the bromine compound, whereby after foaming the expandable polystyrene particles, said foamed particles show a coarse cellular structure of from about 4 to 7 cells/mm in the interior while the thin peripheral zone has a fine cellular structure which is from about 0.1 to 3 mm thick, said peripheral zone having a negligible thickness compared to the total cross-sectional area of the foamed particle.

6. A process as set forth in claim 2 wherein nucleating agent is added at from 0 to 120 minutes before the end of the polymerization cycle.

* * * * *